US006602630B1

(12) United States Patent
Gopal

(10) Patent No.: US 6,602,630 B1
(45) Date of Patent: Aug. 5, 2003

(54) MEMBRANE ELECTRODE ASSEMBLIES FOR ELECTROCHEMICAL CELLS

(75) Inventor: Ramanathan Gopal, Williamsville, NY (US)

(73) Assignee: The Electrosynthesis Company, Inc., Lancaster, NY (US)

( * ) Notice: Subject to any disclaimer, the term of this patent is extended or adjusted under 35 U.S.C. 154(b) by 0 days.

(21) Appl. No.: 09/805,314

(22) Filed: Mar. 13, 2001

Related U.S. Application Data

(60) Provisional application No. 60/189,186, filed on Mar. 14, 2000.

(51) Int. Cl.$^7$ .................................................. H01M 8/10
(52) U.S. Cl. .............................. 429/30; 429/46; 429/33; 429/304
(58) Field of Search ............................ 429/30, 46, 33, 429/304

(56) References Cited

U.S. PATENT DOCUMENTS

| 5,234,777 A | * | 8/1993 | Wilson ........................ 429/33 |
| 5,501,915 A | | 3/1996 | Hards et al. ................... 429/42 |
| 5,523,177 A | | 6/1996 | Kosek et al. .................. 429/40 |
| 5,672,438 A | | 9/1997 | Banerjee et al. ............... 429/33 |
| 5,672,439 A | | 9/1997 | Wilkinson et al. ............. 429/40 |
| 5,702,755 A | | 12/1997 | Mussell ....................... 427/115 |
| 5,869,416 A | | 2/1999 | Mussell ....................... 502/101 |
| 5,874,182 A | | 2/1999 | Wilkinson .................... 429/30 |
| 5,919,583 A | | 7/1999 | Grot et al. .................... 429/33 |
| 5,945,231 A | | 8/1999 | Narayanan et al. ............ 429/30 |
| 5,958,616 A | | 9/1999 | Salinas et al. ................. 429/41 |
| 5,992,008 A | | 11/1999 | Kindler ........................ 29/730 |
| 6,060,190 A | | 5/2000 | Campbell et al. ............. 429/40 |
| 6,309,772 B1 | * | 10/2001 | Zuber et al. .................. 429/33 |

FOREIGN PATENT DOCUMENTS

| EP | 0 631 337 A2 | * | 12/1994 |
| JP | 7-201344 | * | 8/1995 |
| JP | 10-270057 | * | 10/1998 |

OTHER PUBLICATIONS

Adi Eisenberg and Howard Yeager, editors, Perflourinated Ionomer Membranes, 1982, pp. 455–459.

A.S. Arico, A.K. Shukla, K.M. El–Khatib, P. Creti, and V. Antonucci, Effect of Carbon–Supported and Unsupported Pt–Ru Anodes on the Performance of Solid–Polymer–Electrolyte Direct Methanol Fuel Cells, Journal of Applied Electrochemistry, 1998, pp. 671–676.

(List continued on next page.)

Primary Examiner—Laura Weiner
(74) Attorney, Agent, or Firm—Howard M. Ellis

(57) ABSTRACT

Membrane electrode assemblies (MEA) comprise an asymmetric membrane composite, a cathode and an anode in electrical contact with the composite to form solid polymer electrolytes. The asymmetric membrane composites comprise a thin, continuous, non-porous, but water and proton permeable polymeric film layer, an adjacent thicker stratum or layer consisting of a porous support backing and a catalyst impregnated mainly in the porous support region. The catalyst may be one, for example, that is suitable for the oxidation of unreacted alcohol. The MEAs may be employed in both energy producing electrochemical cells, e.g. fuel cells and energy consuming electrochemical cells for the synthesis of chemicals. The MEAs may be adapted for direct feed methanol fuel cells and are especially useful in eliminating crossover of unreacted methanol to the cathode and unwanted voltage reduction.

32 Claims, 6 Drawing Sheets

OTHER PUBLICATIONS

A.S. Arico, S. Srinivasan, and V. Antonucci, DMFCs:From Fundamental Aspects to Technology Development, Fuel Cells 2001, pp. 133–161.

The Electrosynthesis Company, Inc. Membrane Electrode Assembly Fabrication for Fuel Cell Applications (Proprietary and Confidential) No date given.

Minoru Mizuhata, Kazuaki Yasuda, Keisuke Oguro and Hiroyasu Takenaka Preparation of Gas Diffusion Electrode with Highly–Active Catalyst for PEFC's Osaka National Research Institute, AIST, MITI, 1–8–31 Midorigaoka, Ikeda, Osaka 563, Japan Electrochemical Society Proceedings vol. 95–23 pp. 24–33, Oct. 1995.

Cong Pu, Wenhua Huang, Kevin L. Ley and Eugene S. S,ptlom A Methanol Impermeable Proton Conducting Composite Electrolyte System Department of Chemical and Biological Sciences, Illnois Institute of Technology, Chicago, Illinois 60616, USA J. Electrochem. Soc., vol. 142, No. 7, Jul. 1995 L119.

A.K. Shukla, P. Stevens, A. Hamnett, J.B. Goodenough A Nafion–Bound Platinized Carbon Electrode for Oxygen Reduction in Solid Polymer Electrolyte Cells Inorganic Chemistry Laboratory, Oxford University, South Parks Road, Oxford OX1 3QR, UK Journal of Applied Electrochemistry 19 (1989) 383–386 No date.

Christine Zawodzinski, Mahlon S. Wilson, and Shimshon Gottesfeld Pem Fuel Cell Stack Development Based on Membrane–Electrode Assemblies of Ultra–Low Platinum Loadings Materials Science and Technology Division, Los Alamos National Laboratory, Los Alamos, N.M, 87545 Electrochemical Society Proceedings vol. 95–23, pp. 57–63, Nov. 1992.

M.S. Wilson, S. Gottesfeld Thin–Film Catalyst Layers for Polymer Electrolyte Fuel Cell Electrodes Electronics Research Group, Los Alamos National Laboratory, Los Alamos, New Mexico 87545, USA Journal of Applied Electrochemistry 22 (1992) 1–7 No date.

* cited by examiner

MEMBRANE ELECTRODE ASSEMBLIES FOR ELECTROCHEMICAL CELLS

CROSS-REFERENCE TO RELATED APPLICATION

This application claims priority under U.S. Provisional Application Ser. No. 60/189,186, filed Mar. 14, 2000.

TECHNICAL FIELD

This invention relates generally to electrochemical cells, and more specifically, to membrane electrode assemblies particularly useful in energy producing fuel cells and energy consuming electrosynthesis cells and methods of manufacture.

BACKGROUND OF THE INVENTION

Electrochemical cells for converting chemical energy directly to electrical energy rely on chemical reactions between an electrolyte and a fuel. One well known fuel cell, namely the hydrogen/oxygen type fuel cell, relies on anodic and cathodic reactions which lead to the generation and flow of electrons and electrical energy as a useful power source for many applications. The anodic and cathodic reactions in a hydrogen/oxygen fuel cell may be represented as follows:

$$H_2 \rightarrow 2H^+ + 2e^- \text{ (Anode)}$$

$$\tfrac{1}{2}O_2 + 2e^- \rightarrow H_2O \text{ (Cathode)}$$

Platinum catalysts are used to bring about both of the foregoing anodic and cathodic reactions. These catalysts typically in combination with activated carbon, organic binder and fluorocarbon polymers, such as Teflon® are bonded to either side of a proton conducting ion-exchange membrane to fabricate a membrane electrode assembly (MEA).

In the case of hydrogen/oxygen fuel cells, some improvements in catalyst application methods have been directed towards reducing the amount of costly platinum catalyst in formulations. Development of compositions, for example, was achieved by combining solubilized perfluorosulfonate ionomer (Nafion®), support catalyst (Pt on carbon), glycerol and water. This led to the use of low platinum loading electrodes. The following publications teach some of these methods for hydrogen/oxygen fuel cells: U.S. Pat. No. 5,234,777 to Wilson; M. S. Wilson, et al, *J. App. Electrochem.*, 22 (1992) 1–7; C. Zawodzinski, et al, *Electrochem. Soc. Proc.*, Vol. 95–23 (1995) 57–65; A. K. Shukla, et al, *J. App. Electrochem.*, 19(1989) 383–386; U.S. Pat. No. 5,702,755 to Messell; U.S. Pat. No. 5,859,416 to Mussell; U.S. Pat. No. 5,501,915 to Hards, et al.

Fuel cells utilizing hydrogen as fuel, however, are not viewed as entirely suitable for portable applications, such as motorized vehicles, due mainly to problems associated with hydrogen storage. A more suitable alternative fuel would be a liquid fuel, such as a simple alcohol, like methanol, which can be used in a low cost dilute aqueous solution. There are reports in the literature of MEAs specifically for methanol fed fuel cells. The reactions at the electrodes are as follows:

$$CH_3OH + H_2O \rightarrow CO_2 + 6H^+ + 6e^- \text{ (Anode)}$$

$$1\tfrac{1}{2}O_2 + 6H^+ + 6e^- \rightarrow 3H_2O \text{ (Cathode)}$$

While direct fed methanol fuel cells offer a good alternative to hydrogen type fuel cells, there are still technical problems associated with such cells. One key problem is proton membrane inefficiency allowing the permeation or transport of unreacted methanol fuel to the cathode side of the MEA where it undergoes oxidation from oxygen and catalyst to form carbon dioxide and water. This leads to fuel loss, as well as significant loss in fuel cell efficiency, i.e., voltage drop. A number of reports and patents in the literature describe methods for remedying methanol permeation across the membrane while retaining proton conductivity, as high as possible. Representative patents and other publications include: U.S. Pat. No. 5,523,177 to Kosek, et al; U.S. Pat. No. 5,672,439 and U.S. Pat. No. 5,874,182 to Wilkinson, et al; U.S. Pat. No. 5,945,231 to Narayanan, et al; U.S. Pat. No. 5,672,438 to Banerjee, et al; U.S. Pat. No. 5,992,008 to Kindler; U.S. Pat. No. 5,958,616 to Salinas, et al; U.S. Pat. No. 5,919,583 to Grot, et al; Cong Pu, et al, *J. Electrochem. Soc.*, (142)7, (1995), L119–120;

While some progress has been made in the development of better performing solid polymer electrolytes for direct feed methanol fuel cells employing proton transporting membranes with lower methanol transport coefficient properties, most of the improved membranes still have been found to allow permeation of unreacted fuel to the cathode at sufficient levels to cause unacceptable voltage drops and wasted fuel.

Accordingly, there is need for improved membrane electrode assemblies for fuel cells and other electrochemical applications which allow for efficient transport of needed protons generated at the anode, while eliminating all or virtually all crossover of unreacted alcohol fuels from the anode to the cathode.

SUMMARY OF THE INVENTION

It is therefore one principal object of this invention to provide improved membrane electrode assemblies (MEA) with more efficient proton transport from the anode to the cathode while restricting the crossover of all, or virtually all unreacted fuel from the anode.

The MEAs of this invention are characterized by the following structural features:

An asymmetric membrane composite, and a cathode and anode in electrical contact with the composite forming a solid polymer electrolyte. In the case of methanol type fuel cell, anodes preferably include a deposited catalyst for converting the alcoholic fuel to needed protons, plus water and carbon dioxide. The asymmetric membrane is a composite structure comprising a non-porous, water and proton permeable, thin polymeric film, and a thicker porous support layer (stratum) or backing in juxtaposition therewith, wherein the alcohol oxidation catalyst is dispersed. The outer polymeric film layer and the porous support layer are preferably part of the same structure and exist as an integral film, wherein the outer film layer is a continuous film which retains the cation exchange properties, including proton transport characteristics and non-porous properties of the original unmodified polymer. Whereas the porous support layer backing is physically modified into a high surface area porous stratum having tortuous paths with most of the alcohol oxidation catalyst embedded therein for greater surface exposure to unreacted liquid fuel.

Deposition of the alcohol oxidation catalyst mainly in the porous support region provides important benefits, namely more effective proton transport due to continuous presence of cationic proton conducting polymer throughout the catalyst region; the presence of catalyst at the interface between the thin film separating membrane and the adjacent thicker porous support layer allowing for more complete oxidation of any unreacted alcohol; in the case of ion-exchange polymers possessing very low or near zero methanol diffusion coefficients, all or virtually all unreacted methanol is prevented from reaching the cathode, since the polymer is present throughout the catalyst region. The efficiency of the direct fed methanol fuel cell is thereby greatly enhanced.

The asymmetric composites are formed from cation-exchange polymers, preferably perfluorosulfonic acid types, such as DuPont's Nafion brand of permselective cation-exchange membrane, or other similar performing water and proton transporting cationic type exchange materials. The asymmetric composites of the invention comprise the aforementioned non-porous, but water and proton transportable films preferably as a continuous, very thin outer layer allowing for the transport of protons formed at the anode, plus water to selectively crossover to the cathode where the protons react with oxygen. Similarly, this continuous film layer also serves to restrict the transport of residual amounts of remaining unreacted alcoholic fuel from crossing over to the cathode. That is, the permselective properties of the continuous, non-porous thin film portion of the asymmetric composite serve as a fail-safe in restricting the transport of still any unreacted fugitive alcoholic fuel, preventing it from crossing over and reacting at the cathode, and causing a reduction cell voltage.

Dimensionally, the non-porous film layer of the asymmetric composite is very thin relative to the porous support layer. Thicknesses of the non-porous film layer can vary generally from about 2 to about 10 $\mu$m. The thicker porous support layer backing for the thin film also performs as a high surface area substrate or bed for the oxidation catalyst for greater surface contact with unreacted alcoholic fuel and for more efficient decomposition of all, or virtually all remaining unreacted alcohol in the alcohol-water fuel mixture. The thicker porous support layer with oxidation catalyst deposited therein facilitates the conversion of unreacted fuel to carbon dioxide, water and protons. Known precious metal catalysts, such as platinum/ruthenium metal, combinations of their oxides and alloys of platinum/ruthenium, including partially reduced platinum/ruthenium are deposited principally in the interior pores of the high surface area porous support layer for rapid conversion of residual unreacted alcoholic fuels. Through this process, undesirable crossover of unreacted fuel from the anode side to the cathode side is prevented or minimized and voltage fall-offs are prevented, or at least significantly reduced. Hence, the asymmetric catalytic membrane composites of the present invention provide for more efficient operating solid polymer electrolytes for use in the operation of direct fed methanol fuel cells, and other types of electrolytic cells.

Optionally, the asymmetric membrane composites of the present invention may also be used in-combination with supplemental ion-exchange membranes. For example, in the event of surface imperfections in the thin, non-porous polymeric film surface of the asymmetric composite. Such surface imperfections may allow transport of small, but performance impeding amounts of unreacted fuel from the anode to the cathode side of the MEA. This can be remedied by means of the supplemental cation exchange membrane layer applied to the thin outer film layer. The supplemental membrane restricts the transport of residual amounts of unreacted fuels to the cathode while still allowing the passage protons. The supplemental membrane may also be employed as a spacer device in electrochemical cells, when necessary. While useful, this supplemental membrane structure may result in somewhat higher internal resistances (IR) causing some voltage penalty.

It is still a further object of this invention to provide methods for manufacturing the improved membrane electrode assemblies as disclosed herein. One embodiment is a type of phase inversion process performed by the steps which comprise:

(i) forming a solution, preferably one which is concentrated comprising a cationic (, i.e., proton) transporting polymer by dissolution of a sufficient amount of the polymer in a first organic solvent to form the solution;

(ii) forming a catalyst-cationic polymer dispersion by mixing an appropriate catalyst with the solution of cationic polymer of step (i);

(iii) forming or casting a film from the catalyst-cationic polymer dispersion;

(iv) contacting the film with a second solvent which is miscible in the first organic solvent. However, the second solvent should be a non-solvent, e.g., water or alcohol, for the film. That is, the polymeric film should be insoluble in the second solvent, while the first solvent used in the solubilization of the polymer must be completely miscible with the non-solvent, and (v) with the aid of the two solvent system the cast film is converted into a membrane with a very thin continuous outer skin layer, wherein the native non-porous, permselective proton transport properties are retained.

The two solvent system also forms the substantially thicker, porous support layer backing. In contrast to the very thin outer skin layer, the backing of the film is converted to a high surface area support layer having many tortuous paths. Accordingly, the porous support layer also performs as a high surface area substrate or bed for most of the oxidation catalyst introduced into the solution according to step (ii) for facilitating the conversion of unreacted alcohol to protons and water.

Pores in the thicker support layer are formed during slow evaporation of the solvent from the film at temperatures ranging from about 10 to about 50° C. causing the polymer to solidify, i.e., undergo gelation.

As an alternative embodiment the catalyst-containing asymmetric membrane composites of this invention may also be prepared using salt solutions of precious metals, like platinum and ruthenium and converting the salts in-situ to their corresponding reactive metals. This alternative embodiment includes the steps of:

(i) forming a solution, more preferably a concentrated solution, comprising a cationic polymer by dissolution of a sufficient amount of the polymer in a first organic solvent;

(ii) casting a film from the solution comprising the cationic polymer;

(iii) contacting the film with a second solvent which is miscible in the first solvent. The second solvent should also be a non-solvent, e.g., water or alcohol, for the film, i.e., the film should be insoluble in the second solvent;

(iv) converting the film of step (iii) to an asymmetric membrane composite structure by solvent evaporation during gelation of the polymer. The film is converted to an asymmetric membrane. composite comprising the non-porous, preferably continuous, water and proton permeable very thin polymeric film and an adjacent thicker porous support layer therefor, free of catalyst;

(v) contacting the asymmetric membrane composite structure with a solution comprising metal salts for exchange by the membrane. The metals of the metal salts are any of those known to be suitable for catalyzing the oxidation of unreacted alcohol at least to protons, for example, and (vi) converting the metal salts in-situ in the membrane to alcohol oxidizing catalyst. This useful alternative conducts the conversion reaction where most of the alcohol oxidizing catalyst is needed, namely in the high surface area porous support layer.

The conversion step of the process can be conveniently performed by treating the membrane with reducing agents, like sodium borohydride, stannous chloride, hydrazine, formic acid, and so on. In so doing, the exchanged/deposited salts are readily converted to reactive free metals, in-situ.

The improved MEAs of this invention not only find uses in direct fed methanol fuel cells and in hydrogen/air fuel cells, but are also suitable for use in other electrochemical cells and processes. For instance, in catalytic membrane reactors for conducting reactions. They can be used in hydrogenation processes, where one reactant is a gas which preferentially diffuses across the asymmetric membrane in the reactor. Examples of such reactions include the catalytic combining of hydrogen and oxygen to form hydrogen peroxide. The asymmetric membranes of the invention can also be used in separating highly explosive mixtures of hydrogen and oxygen.

Other representative applications for the MEAs of this invention include sensors, such as for the detection of alcohol, where a catalyst suitable for bringing about an electrochemical oxidation/reduction can be used when measured against a reference electrode. This provides a suitable means for measuring alcohol concentration.

The novel MEAs of this invention may also be employed in electrochemical syntheses reactions in electrolytic cells. They include hydrogen peroxide synthesis from oxygen reduction, or with redox catalysts, electrochemical hydrogenation of oil, and many other electrochemical syntheses requiring catalytic membranes which act as ionic conductors, as well as separators between anodes and cathodes.

BRIEF DESCRIPTION OF THE DRAWINGS

The present invention may be described by way of examples to the accompanying drawings in which.

DESCRIPTION OF THE PREFERRED EMBODIMENTS

Figure 1:
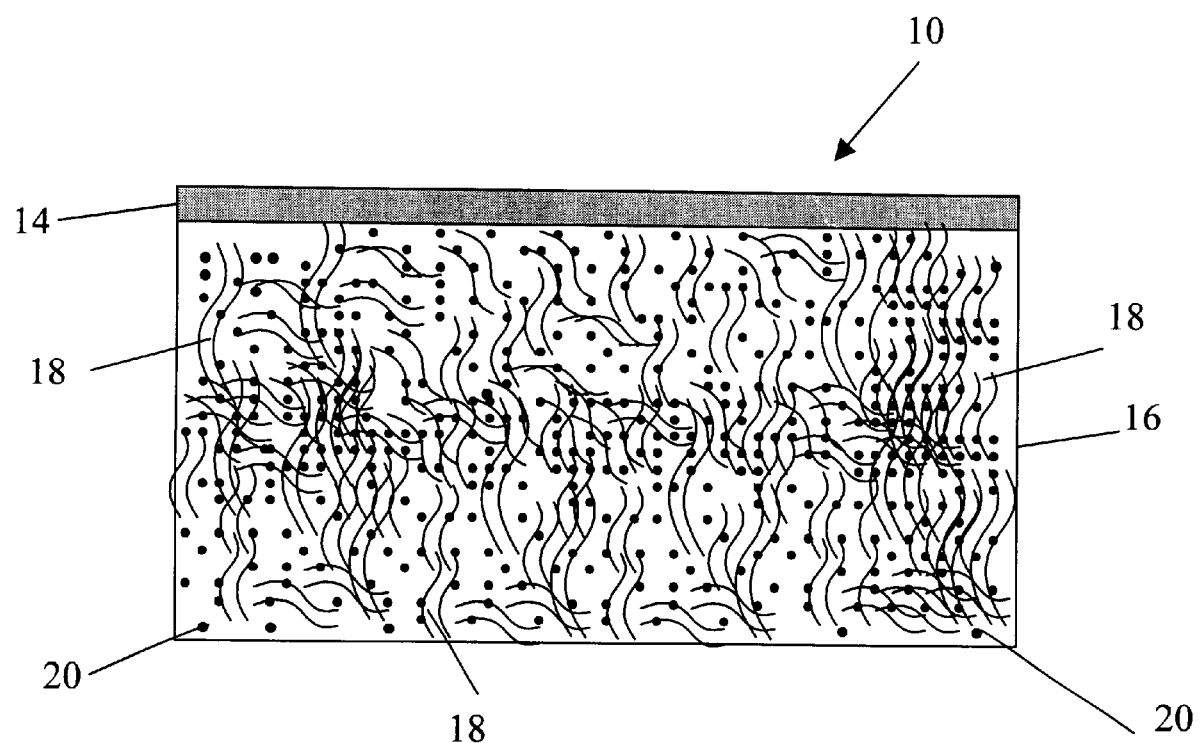
FIG. 1 is an enlarged sectional view of an asymmetric membrane composite.
Figure 2:
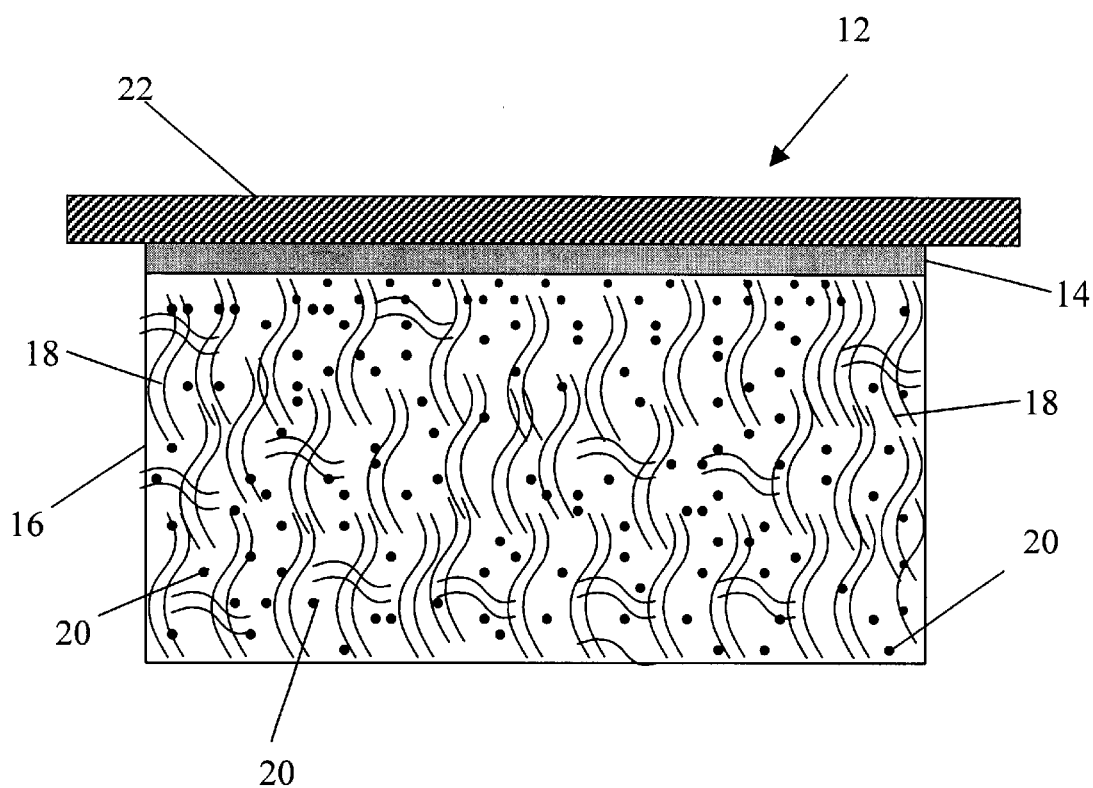
FIG. 2 is an enlarged sectional view of the asymmetric membrane composite of FIG. 1 with supplemental membrane.

Turning first to FIGS. 1 and 2, we find illustrated enlarged views of two embodiments of asymmetric membrane composite structures 10 and 12. The composite structures are readily prepared from known, commercially available cationic polymers, such as E. I. DuPont's Nafion® brand perfluorosulfonic acid membranes, like Nafion 112, 115 and 117. Other representative polymeric membranes include, Flemion® and Aciplex® brand perfluorosulfonic acid polymeric membranes from Asahi Glass, and Neosepta® brand perfluorinated membranes from Tokuyama Soda. Other representative examples of useful polymeric membrane materials include those having hydrocarbon backbones prepared using non-fluorinated polymers. Sulfonic acid groups are introduced onto their backbones for proton transport conductivity. A few representative examples include poly (styrene sulfonic acid), sulfonated poly(etheretherketone) or PEEK, sulfonated poly(phenylene sulfide), sulfonated polyphosphazene, sulfonated poly(ethersulfone), polybenzimidazole (PBI), and the like. Overall, sulfonic acid based membranes provide the most favorable properties for fuel cell applications, Carboxylic acid type membranes, while satisfactory for some applications, exhibit lower conductivities, and consequently, are less preferred in fuel cell applications.

Membranes with the lowest methanol diffusion coefficients are most preferred. This would include such representative examples as Nafion 117 grade material having a diffusion coefficient of $6.5 \times 10^{-6}$ $cm^2/sec$@30° C. and polyphosphazene based membranes having even lower methanol diffusion coefficients in the range of $8.5 \times 10^{-8}$ $cm^2/sec$. It will be noted that methanol diffusion coefficient data are not always readily available for ion-exchange membranes, however, diffusion coefficients are often based on comparisons against a standard, such as Nafion 117 membrane, and quoted on a basis of percent improvement. See, for example, U.S. Pat. No. 5,672,439.

The foregoing polymeric membranous materials may be generally characterized as being non-porous, but permselective, i.e., allowing transport of mainly positively charged ions, water and gases, including the transport of protons, so they readily diffuse through and crossover from one side of the membrane to the opposite side. However, such polymers usually have inherent inefficiencies allowing the diffusion of unwanted molecules and ionized substances to pass from one side of the membrane to the other. This would include alcoholic fuel mixtures, like unreacted methanol in direct feed methanol fuel cells. Unreacted methanol allowed to pass from the anode to the cathode side of a fuel cell becomes oxidized by oxygen and catalyst to form carbon dioxide and water. Consequently, there is both loss of fuel and a voltage penalty.

The asymmetric membranes of the invention retain a very thin outer film or skin layer 14 of the continuous, non-porous, proton conducting polymeric membrane. Typically, the thin skin layer 14 may have a thickness ranging generally from about 1 to about 10 microns. The thin outer continuous film layers 14 of the asymmetric composites 10 and 12 retain the important native properties of the original polymer, including the selective transport of mainly water, gases, protons, and other positively charged ions. Similarly, properties of the outer layer 14 restrict crossover of anions and non-polar solvents like alcohol fuels.

By contrast, the backside stratum or support layer 16 of the same asymmetric membrane composite, although of the same compositional makeup, is substantially different in its physical properties. Backside support layer 16, which is an extension of thin film layer 14, is several fold thicker than the outer membrane layer 14. Instead of being a continuous film like that of layer 14, thicker support layer 16 is comprised of a matrix of tortuous paths 18 providing a high surface area for maximizing contact with unreacted fuel or other electrolyte-containing liquids. Thus, high surface area internal matrices 18 provide a useful substrate or bed for the deposition of catalytic material 20, and as reaction site for efficient mass transport of even minor amounts of unreacted methanol remaining in fuel cell fuel. Accordingly, the thicker, higher surface area backing layer 16 with catalyst 20 deposited mainly in the high surface area interstices of tortuous paths 18 assures very prompt reaction kinetics, whereby unreacted methanol, for instance, is taken to its highest oxidation state, i.e., protons, water and carbon dioxide. Thus, little if any unreacted fuel is available for transport to the cathode side of the membrane for unwanted diminution of voltage.

However, in the event of any remaining unoxidized methanol after contact with the membrane interior, the potential for unwanted crossover occurring will be reduced further as a result of the continuous, non-porous and permselective properties of layer 14. The thin outer film layer 14 with its non-porous, permselective properties will perform much as a fail-safe, limiting transport of any unoxidized methanol to the cathode side while readily allowing transport of protons and water after contact with the porous support layer.

FIG. 2 provides a still further option of employing a supplemental cationic membrane film layer 22 which can be engaged with thin film layer 14 of the asymmetric membrane. Because supplemental membrane 22 is also a permselective, cationic type membrane it may be optionally employed in the event of any imperfections, for example, which may occur in the thin outer film layer 14. Supplemental film layer 22 may also be used in the event a spacer is needed in filing a gap in any electrolytic cell employing the asymmetric membranes of this invention.

The starting ion-exchange polymeric material will determine the initial steps employed in preparing the asymmetric membranes of the invention. If the starting ion-exchange polymer is a perfluorosulfonic acid type, like Nafion, solutions can be prepared by means of a mixed solvent system. In this regard, a mixture of 1-propanol, 2-propanol, butanol and methanol can be used as the solvent system. Nafion brand polymer commercially available in the form of beads or powder is mixed with the above solvent mixture using high shear at temperatures ranging up to about 90° C. and under pressure. A solution containing >10% polymer can be prepared by this method.

In addition to the above method, preformed solutions of Nafion ion-exchange polymer are available from DuPont. The solution consists of at least 10% perfluorosulfonic acid polymer dissolved in a solvent containing 1-propanol (up to 30%), 2-propanol (up to 30%), butanol (up to 10%), and methanol (from 5 to 10%). The solution as received from the manufacturer can be used as is to prepare the asymmetric membranes of the invention.

Thirdly, perfluorosulfonic acid polymer solutions can be prepared from the thermoplastic form containing sulfonyl fluoride groups ($SO_2F$) in place of sulfonic acid groups ($SO_3H$). The sulfonyl fluoride polymer is usually the starting material for preparation of ion exchange membrane, like Nafion brand, etc. The sulfonyl fluoride polymer can also be used to prepare the asymmetric membranes by conversion of the sulfonyl fluoride groups to sulfonic acid (salt form such as sodium) by hydrolysis of the polymer. The sulfonyl fluoride is immersed in at least 25 weight-percent sodium hydroxide for about 16 hours at a temperature of about 90° C. Sulfonyl fluoride is thus converted to sodium sulfonate ($SO_3Na$). The sulfonic acid form of the membrane is prepared by equilibrating the membrane in acid solution, such as sulfuric acid, followed by rinsing in deionized water.

The previously mentioned non-fluorinated ion-exchange polymers having hydrocarbon backbones, provide a cost benefit over the perfluorosulfonic acid type membranes. Sulfonated polyphosphazene, poly, styrene sulfonic acid), sulfonated poly(etheretherketone) (PEEK), sulfonated poly (phenylene sulfide) poly(ethersulfone), and so on, are soluble in organic solvents like N-methyl pyrrolidone, dimethyl formamide (DMF), dimethyl acetamide, dimethyl acetate, etc.

Solutions of the above membranes are prepared in concentrations generally ranging from about 10 to about 30 percent by-weight. A film of the polymer is cast on a glass plate heated to 50 to 70° C. using a doctor blade to control the desired thickness. The film is then immersed in a second solvent, usually water, alcohol or a mixture of solvents which prompts the formation of a non-porous thin skin layer typically in the range of 1 to 10 microns depending on the rate of evaporation of the solvent. This process also provides the thicker, highly porous support layer backing for the thin film layer. The thickness of the membrane should be sufficient to withstand the pressures generated by transport without rupturing the membrane. Generally, the asymmetric membrane will have a thickness ranging from about 0.1 to about 1.0 mm.

To introduce the catalyst, before casting the film the polymer concentrate solution and catalyst can be mixed well together. Platinum and ruthenium metal alloys are preferred for oxidation of methanol to carbon dioxide, however, other known solid catalytic materials may be employed in order to meet the end-use applications of the asymmetric membrane composites disclosed herein. The catalyst, for example, can be deposited on high surface area carbons, such as Vulcan® XC-72 available from Cabot Carbon. Similar type catalysts are also commercially available from E-TEK, Division of DeNora N.A., Inc. (Somerset, N.J.), and Johnson-Matthey Company, UK. Platinum-ruthenium alloy catalyst may be used at a loading in the range from about 25 to about 75 percent-by-weight. Most preferred platinum and ruthenium catalyst compositions comprise equal quantities of both platinum and ruthenium metals or metal alloys.

The catalyst-containing membrane can also be fabricated by first making the asymmetric membrane. Salt solutions of platinum and ruthenium, such as metal chlorides can be exchanged into the asymmetric membrane. The metal salts imbibed by the membrane are then reduced in-situ to the corresponding metal by contacting with reducing agents, such as sodium borohydride, stannous chloride, hydrazine, formic acids, to name but a few.

The asymmetric membrane and the supplemental ion-exchange membrane can be bonded together by methods generally known among ordinary skilled artisans in the field. This would include such methods as solvent gluing where a uniform layer of solvent is first painted onto the thin film layer 14 of the asymmetric membrane. The supplemental membrane is then compressed onto the asymmetric membrane. The assembly is then dried to evaporate the solvent.

Figure 3:
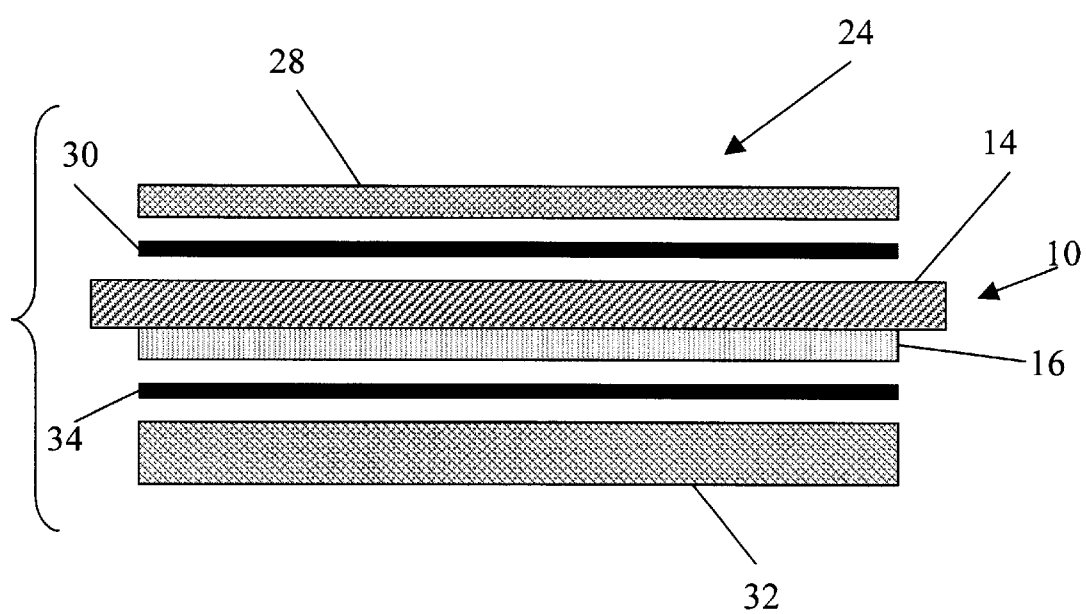
FIG. 3 is exploded view of a membrane electrode assembly with asymmetric membrane.
Figure 4:
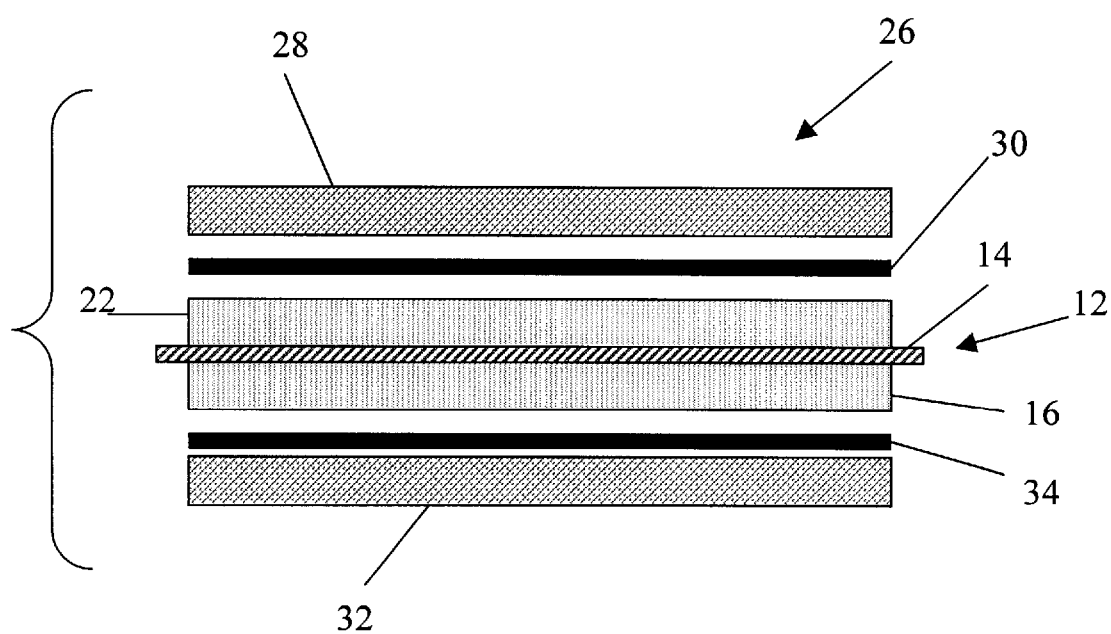
FIG. 4 is an exploded view of a membrane electrode assembly with supplemental membrane

FIGS. 3 and 4 are exploded views of MEAs of the invention. FIG. 3 is illustrative of MEA 24 with the asymmetric membrane composite of the type shown by FIG. 1, whereas FIG. 4 is illustrative of MEA 26 having incorporated the asymmetric membrane of FIG. 2 with supplemental membrane 22. MEAs 24 and 26 comprise asymmetric membranes 10 and 12, respectively, each utilizing high surface area porous cathode electrodes 28 and a cathode catalytic layer 30 bonded to inside surface of the cathode 28 and the asymmetric membrane composite. The porous cathodes 28 are preferably high surface area carbon cloths or papers. They are commercially available from various sources, such as Zoltek, and E-TEK, Division of DeNora NA, Inc., Somerset, N.J. They consist of a tightly woven knit material, such as GC-16, which is pretreated with Teflon (5 to 30% by-weight) or other fluoropolymer to impart hydrophobicity to the surface without loss in conductivity. The process involves several applications of a dilute solution of 3% by-weight of the fluorocarbon polymer several times to achieve the required weight. The cathode is then heated at 150° C. for 0.5 hours followed by heating to 350° C. for a further 0.5 hour period.

Catalytic layer 30 is needed in a fuel cell to facilitate the reduction of air or oxygen with protons to form water at the cathode 28. Catalyst layer 30 preferably comprises platinum metal or other precious metal deposited onto a high surface area carbon substrate, such as Vulcan XC-72 carbon from Cabot Carbon. Such catalysts are also commercially available through ordinary channels of commerce. Platinum loading can range from about 1 to about 5 mg/cm$^2$ While catalytic layer 30 and high surface area cathode 28 are illustrated in exploded view, in practice they are in intimate contact with one another. Cathode electrode 28 and catalytic layer 30 are bonded with adhesive, and with the application of heat and pressure formed into a unit structure (not shown) using methods familiar to persons skilled in the art. This cathode-catalyst structure can also be affixed to the thin non-porous film layer 14 (FIG. 3) or the supplemental membrane 22 (FIG. 4) of the asymmetric membrane composites using the same technique.

In a similar manner, porous, high surface area anode electrode structures 32 are prepared using carbons, e.g., cloths, papers, etc., like those used in the cathode electrode structures. In addition, anode catalyst layers 34 are employed in combination with the anode structures to facilitate the oxidation of alcohol/water fuel mixtures to form protons, water and carbon dioxide.

The normal catalyst loading for an anode in a methanol fuel cell is in the range of about 1 to about 10 mg/cm$^2$, and more preferably at about 2 to about 5 mg/cm$^2$. The required amount of catalyst (e.g. 20% platinum-ruthenium on carbon) is mixed with Teflon® (from about 5 to about 30 percent, available as a dispersion from E. I. DuPont) or other bonding material, such as Nafion solution, and applied to the high surface area anode material as discussed above. The layers are then heat pressed to obtain good bonding between the structures. The composite structure of porous carbon cloth or paper with the catalyst layer thus forms the anode structure for the methanol fuel cell.

Figure 5:
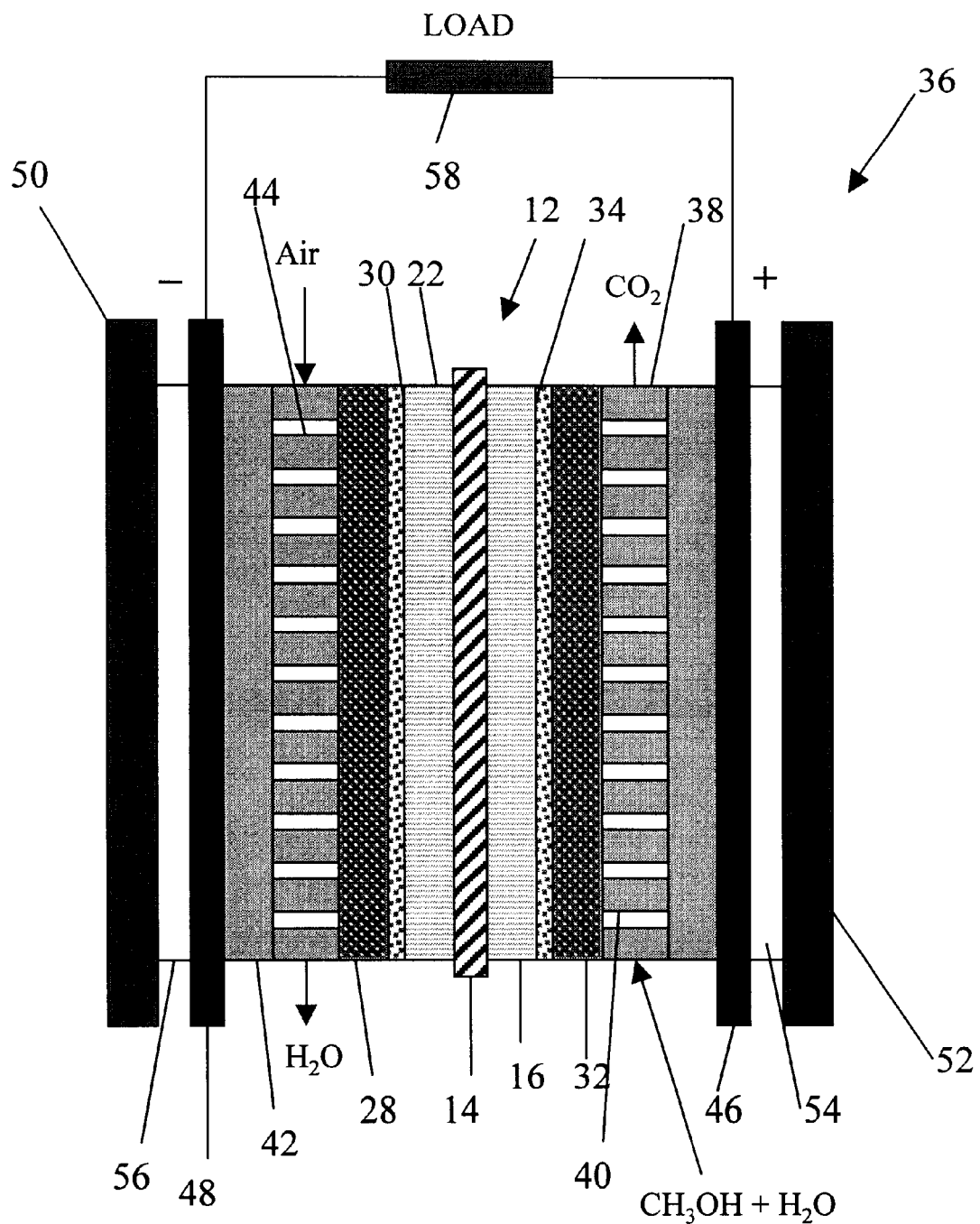
FIG. 5 is a diagrammatic view of a direct fed methanol type fuel cell with membrane electrode assembly of the invention.

The MEAs of the invention are useful in both energy producing and energy consuming electrochemical cells. A preferred embodiment of an energy producing fuel cell is illustrated by FIG. 5 which incorporates the MEA of FIG. 4. Direct feed methanol fuel cell 36 comprises asymmetric membrane composite 12 with a centrally positioned non-porous, permselective, thin, continuous proton exchange membrane 14, thicker porous support layer backing 16 with methanol oxidation catalyst and supplemental non-porous proton exchange membrane 22 adjacent to membrane 14. Fuel cell 36 also includes an anode electrode assembly comprising high surface area anode electrode 32 and anode catalytic layer 34 for converting incoming methanol fuel mixture to protons, carbon dioxide and water. In addition, the fuel cell is equipped with a cathode assembly comprising cathode electrode 28 and cathode catalytic coating 30 for reducing air or oxygen at the cathode assembly in the presence of protons from the anode side to water. Each side of the fuel cell employs graphite blocks 38 and 42 with horizontal channels 40 and 44. Graphite is used in the fuel cell as a current collector and provides the channels 40 and 44 for reactant and product flow. A flat sheet of graphite of appropriate thickness, usually in the range of ⅛ to ½ inch can be used to produce the channels (machined) on each side. The fuel cell also employs copper current collectors 46 and 48 in engagement with graphite blocks 38 and 42. Current collectors 46 and 48 complete the cell circuit for power transmission to a load 58. The cell employs stainless steel end plates 50 and 52 with an insulative plastic film layers 54 and 56.

In operation of the methanol fuel cell of the embodiment of FIG. 5, an aqueous solution of methanol ranging from about 0.5 to about 2 molar in strength (approximately 7 percent solution of methanol and water) is circulated past the anode. Simultaneously, oxygen or air is used as the oxidant and past through the cathode. If air is used (oxygen content of 21%) as the oxidant, the flow requirements are at least 3 times the stoichiometric flow required at the desired current density. The concentration of methanol in the feed solution should be monitored to determine the utilization of methanol fuel for cell operation. Maintenance of a steady voltage (>0.4 volts) at even 80 to 90% utilization of methanol indicates an improved fuel cell operation. Maximum utilization of methanol fuel refers to the fact that the fuel cell maintains a steady voltage even when 90% of the methanol in the feed has been depleted. If any of the methanol fuel is lost to the cathode due to diffusion across the membrane, the utilization factor could be as low as 50%, or even less.

Figure 6:
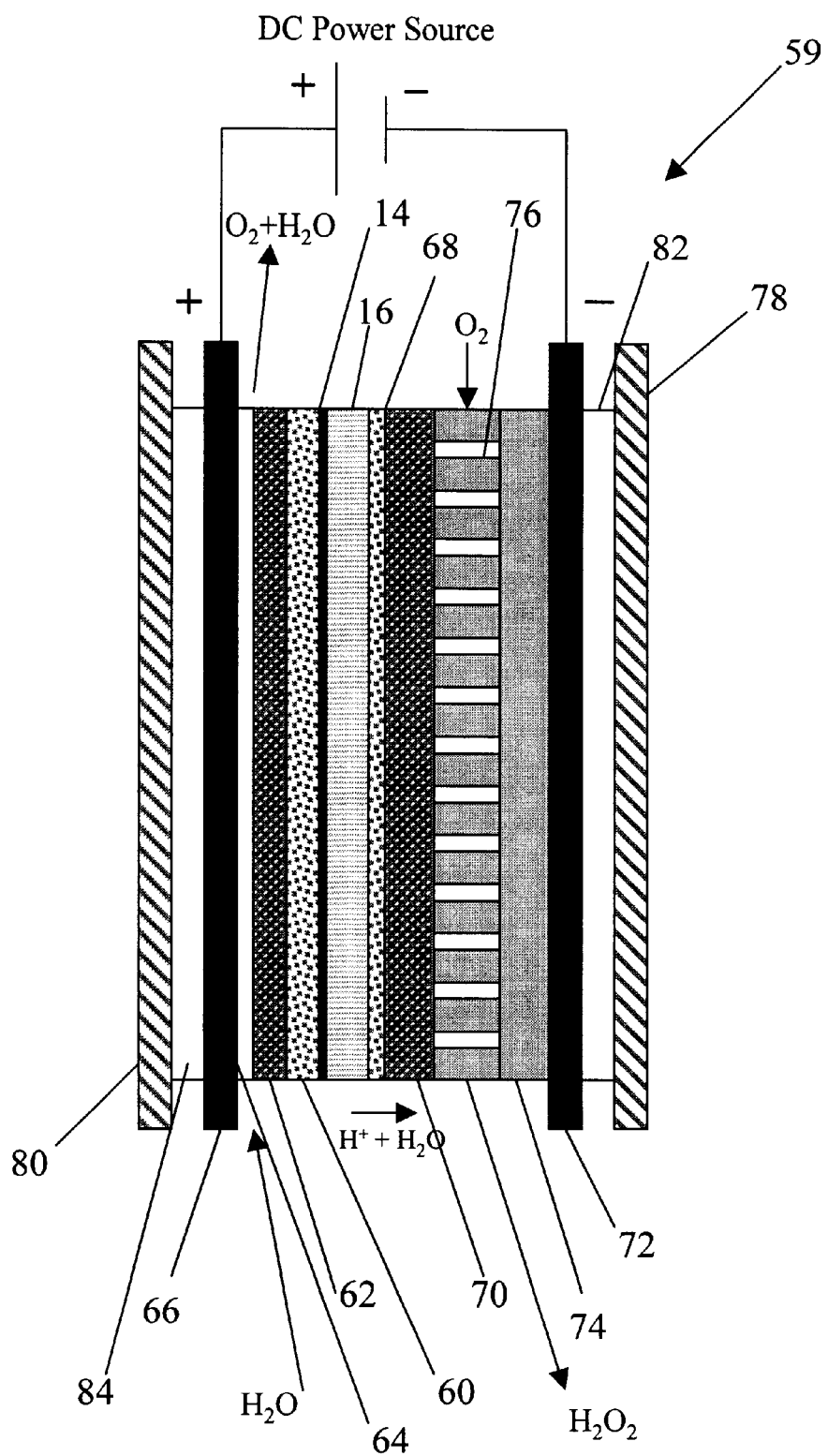
FIG. 6 is a diagrammatic view of an energy consuming electrochemical cell for the synthesis of hydrogen peroxide employing a membrane electrode assembly of the invention.

FIG. 6 illustrates a representative electrochemical cell employing the MEAs of the invention for the synthesis of hydrogen peroxide. The production of hydrogen peroxide may be illustrated by the following reactions:

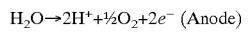

$$H_2O \rightarrow 2H^+ + \tfrac{1}{2}O_2 + 2e^- \text{ (Anode)}$$

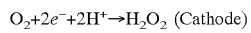

$$O_2 + 2e^- + 2H^+ \rightarrow H_2O_2 \text{ (Cathode)}$$

For this application, cell 59 includes an asymmetric membrane composite structure with a thin, non-porous permselective film layer 14 and a porous support layer 16 with a catalyst, either a high surface area carbon or a metal oxide catalyst. Electrolytic cell 59 includes a porous carbon cloth 62 with catalytic layer 60. Oxides of platinum, iridium, nickel and ruthenium are used as the catalyst. These catalysts are deposited onto high surface area carbons to form the catalytic layer 60. The catalyst layer 60 is bonded to thin film layer 14 of the asymmetric membrane. A very narrow channel 64 is provided for the flow of reactants and products (water and oxygen) at the anode. A carbon or metal anode (nickel or platinum) 66 coated with any suitable catalyst for oxygen evolution, including metal oxides, such as ruthenium, iridium, nickel and platinum can be employed. There is an electrical contact (not shown) between porous carbon cloth 62 and anode 66. On the cathode side, there is a catalyst layer 68 for oxygen reduction to hydrogen peroxide. Catalyst layer 68 may comprise high surface area carbons, like Vulcan XC-72, quinones, e.g., hydroquinone and anthraquinone, and various substituted anthraquinones, such as alizarine, quinizarine, etc., adjacent to a porous carbon cloth 70 is used to effect the reduction of oxygen to hydrogen peroxide. A graphite block cathode 74 flow channels 76 for reactant oxygen and hydrogen peroxide (product) is in direct contact with porous carbon cloth 70. A stainless steel 72 acts as a current collector, as well as a distributor from the DC power supply. Each side of the cell includes stainless steel end plates 78 and 80 and insulative polyethylene sheet 82 and 84 positioned between the electrodes and end plates.

EXAMPLE 1

An asymmetric membrane composite portion of a membrane electrode assembly (MEA) is first prepared. A solution of sulfonated polyphosphazene, poly(bis3-methylphenoxy phosphazene), in dimethylacetamide solvent is prepared to a concentration of at least 20 percent-by-weight. The solution (100 to 200 ml) is stirred in a round-bottomed flask fitted with a heating mantle. The mixture is stirred vigorously at a temperature of 60 to 70° C. to obtain a homogeneous solution. In order to incorporate the catalyst into the membrane, 0.1 to 0.3 grams of Pt/Ru on carbon is added to the polymer solution as a methanol oxidation catalyst. The particles are homogeneously dispersed in the solution (100 to 200 ml). A clean dry glass plate @50 to 70° C. is prepared for casting the solution to form the asymmetric membrane. The polymer/oxidation catalystsolution is spread over 100 to 150 cm$^2$ of the glass plate. The thickness of the membrane is then adjusted by means of a doctor blade.

The glass plate with the cast film is then immediately immersed in a cold water bath to form an asymmetric membrane. The plate is removed from the bath after 5 to 15 minutes and the film is peeled off the glass plate. The resulting membrane contains a very thin (1 to 10 µm)continuous polymer film on top with a porous under layer (0.1 to 1 mm). Since the film is cast with the catalyst particles distributed homogeneously in solution, the film contains catalyst deposited in the porous layer of the membrane, also with some of the catalyst in the continuous top layer. The presence of methanol oxidation catalyst distributed through the high surface area of the porous layer promotes the oxidation of any residual methanol reaching the membrane separator.

EXAMPLE 2

A second asymmetric membrane is prepared following the protocol of Example 1, except a solution of the ion-exchange polymer is prepared without the addition of catalyst. In this case, a similar film is cast from a solution of sulfonated polyphosphazene in dimethyl acetate (at least 20%) without the addition of catalyst. The membrane is equilibrated in a solution containing platinum and ruthenium salts, i.e., a 1:1 ratio of potassium chloroplatinate and ruthenium chloride. Platinum and ruthenium are exchanged into the ion exchange polymer. The membrane is then washed thoroughly in water. The membrane is equilibrated in a solution of sodium borohydride or hydrazine for reduction of the metal ion exchanged in the membrane. An asymmetric membrane with metal catalyst distributed throughout the membrane results.

EXAMPLE 3

The formation of a thin continuous layer of proton exchange polymer is important for use in fuel cells or any other type of electrochemical device. The film provides a barrier for complete mixing of reactants and products from the anode and cathode. Thicker films provide better barriers than thinner films. However, the resistance across the membrane also increases with the thickness of the film formed. With the methods described above, it is possible to control the thickness of the continuous film by controlling the temperature and the solvent mixture used as the non-solvent (water). The thickness of the film can be measured by cross-sectional SEM.

If the thickness of the film is found to be too small (<5 µm) to withstand the pressure applied during cell operation, it is necessary to bond a supplemental membrane layer of the same compositional makeup as the separator between the two asymmetric membrane layers used in the anode and cathode side. They can be bonded together using a solvent or by the application of pressure and temperature (500 to 1500 psi at 50 to 90° C.).

EXAMPLE 4

As a further embodiment of the invention, the asymmetric membranes can be formed directly on catalyzed porous carbon electrodes (anode). The porous carbon electrode with a layer of anode catalyst is placed on a clean glass plate. The edges are taped to the glass with masking tape. A concentrated solution of a proton-transporting membrane in a first organic solvent, with or without methanol oxidation catalyst added to the solution according to Examples 1 or 2 respectively is cast directly onto the porous carbon electrode. The coated electrode is then immersed in a cold water bath to form the asymmetric membrane composite structure with a thin non-porous outer film layer and a thicker porous inner layer with methanol oxidation catalyst distributed mainly in within the porous layer of the ion-exchange polymer securely affixed to the anode electrode structure.

The membrane-anode composite is then fabricated into an MEA by bonding the cathode component. A high surface area carbon cloth having a platinum metal coating is applied to the opposite side, i.e., the thin film layer of the asymmetric coating and at temperatures in the range from about 30 to about 110° C.@ pressures from about 1500 to about 2500 psi bonding the structure together into a one-piece MEA.

It will be understood, the methods disclosed herein are also well suited for asymmetric membranes prepared from proton exchange polymers having hydrocarbon polymer backbones, unlike Nafion brand perfluorosulfonic acid membranes. While Nafion brand membranes are preferred, the invention contemplates membranes prepared from proton exchange polymers having sulfonic acid reactive groups with non-fluorinated polymer backbones, such as poly (styrene sulfonic acid) membranes.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

I claim:

1. A membrane electrode assembly comprising an asymmetric membrane composite, a cathode and an anode in contact with said composite, said asymmetric membrane composite comprising a nonporous, water and proton permeable polymeric film, and a porous support layer with a catalyst distributed therein.

2. The membrane electrode assembly of claim 1 wherein the catalyst is located mainly in the porous support layer of said asymmetric membrane composite, and some of said catalyst is also in said non-porous, water and proton permeable polymeric film.

3. The membrane electrode assembly of claim 1 which comprises a solid polymer electrolyte.

4. An electrochemical cell comprising the membrane electrode assembly of claim 1.

5. The electrochemical cell of claim 4 which is a fuel cell.

6. The fuel cell of claim 5 which is a direct fed methanol fuel cell.

7. The electrochemical cell of claim 4 which is an energy consuming cell for the synthesis of chemicals.

8. A membrane electrode assembly comprising an asymmetric membrane composite, a cathode and anode in contact with said composite, said asymetric membrane composite comprising a nonporous, water and proton permeable polymeric film, and a porous support layer with a catalyst distributed therein, said asymmetric membrane and the anode each comprising catalysts suitable for oxidation of an alcohol.

9. The membrane electrode of claim 8 wherein the asymmetric membrane is a permselective cation-exchange membrane.

10. The membrane electrode assembly of claim 8 wherein the asymmetric membrane composite comprises a cation-exchange membrane further characterized by an alcohol diffusion coefficient of $6.5 \times 10^{-6}$ cm$^2$/sec@30° C., or less.

11. The membrane electrode assembly of claim 10 wherein the membrane is a polyphosphazine-containing membrane.

12. A direct fed methanol fuel cell comprising the membrane electrode assembly of claim 11.

13. A direct fed methanol fuel cell comprising the membrane electrode assembly of claim 10.

14. The membrane electrode assembly of claim 8 wherein said non-porous, water and proton permeable polymeric film of the asymmetric composite is thin relative to the porous support layer, and the membrane and anode alcohol oxidation catalysts comprise both platinum and ruthenium present as metals, metal oxides or alloys.

15. A direct fed methanol feel cell comprising the membrane electrode assembly of claim 14.

16. An electrochemical cell comprising the membrane electrode assembly of claim 2.

17. The electrochemical cell of claim 16 which is a fuel cell.

18. The fuel cell of claim 17 which is a direct fed methanol fuel cell.

19. A membrane electrode assembly comprising an asymmetric membrane composite, a cathode and an anode in contact with said composite, said asymmetric membrane composite comprising a nonporous, water and proton permeable polymeric film, and a porous support layer with a catalyst distributed therein, wherein the asymmetric membrane composite includes a secondary permselective cation-exchange membrane.

20. The membrane electrode assembly of claim 19 wherein said asymmetric membrane and said anode each comprise catalysts suitable for the oxidation of methanol.

21. An electrochemical cell comprising the membrane electrode assembly of claim 20.

22. The electrochemical cell of claim 21 which is a fuel cell.

23. The fuel cell of claim 22 which is a direct fed methanol fuel cell.

24. A method for making an asymmetric membrane composite, said method comprising the steps of:
   (i) providing a solution comprising a cationic polymer in a first organic solvent;
   (ii) forming a catalyst-cationic polymer dispersion by mixing the solution of step (i) with a catalyst suitable for oxidizing an alcohol to provide at least protons;
   (iii) casting a film from said catalyst-cationic polymer dispersion;
   (iv) contacting said film with a secondsolvent which is miscible in said first organic solvent, said film being insoluble in said second solvent;
   (v) converting the film of step (iv) to an asymmetric membrane composite structure by solvent evaporation for gelation of the polymer, said asymmetric membrane composite comprising a nonporous, water and proton permeable polymeric film and an adjacent porous support layer therefor, wherein most of said alcohol oxidizing catalyst is located in said porous support layer.

25. The method of claim 24 wherein said alcohol converting catalyst comprises both platinum and ruthenium present as metals, metal oxides or alloys.

26. The method of claim 24 wherein the asymmetric membrane is further characterized by an alcohol diffusion coefficient of $6.5 \times 10^{-6}$ cm$^2$/sec @30° C., or less.

27. The method of claim 24 wherein the first organic solvent is a member selected from the group consisting of N-methyl pyrrolidone, dimethyl formamide and dimethyl acetamide, and the second solvent is a member selected from the group consisting of water and alcohol.

28. A method for making an asymmetric membrane composite, which comprises the steps of:
   (i) providing a solution comprising a cationic polymer in a first organic solvent;
   (ii) casting a film from said solution comprising the cationic polymer;
   (iii) contacting said film with a second solvent which is miscible in said first organic solvent, said film being insoluble in said second solvent;
   (iv) converting the film of step (iii) to an asymmetric membrane composite structure by solvent evaporation for gelation of the polymer, said asymmetric membrane composite comprising a non-porous, water and proton permeable polymeric film and an adjacent porous support layer therefor;
   (v) contacting said asymmetric membrane composite structure with a solution comprising metal salts for exchange by said membrane, the metals of said metal salts being suitable for oxidizing an alcohol at least to form protons, and
   (vi) converting said metal salts in-situ in said membrane to an alcohol oxidizing catalyst, wherein most of said alcohol oxidizing catalyst is located in said porous support layer.

29. The method of claim 28 wherein said metal salts are converted to free metals by contacting the membrane with a reducing agent.

30. The method of claim 29 wherein the reducing agent is a member selected from the group consisting of sodium borohydride, stannous chloride, hydrazine and formic acid.

31. The method of claim 28 wherein the alcohol oxidizing metals comprise both platinum and ruthenium.

32. The method of claim 28 wherein the asymmetric membrane composite is characterized by an alcohol diffusion coefficient of $6.5 \times 10^{-6}$ cm$^2$/sec@30° C., or less.

* * * * *